(12) United States Patent
Yahata et al.

(10) Patent No.: US 12,413,552 B2
(45) Date of Patent: Sep. 9, 2025

(54) IN-VEHICLE CONTROL APPARATUS

(71) Applicant: Honda Motor Co., Ltd., Tokyo (JP)

(72) Inventors: Kazuki Yahata, Tokyo (JP); Takeshi Okuno, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 17/970,000

(22) Filed: Oct. 20, 2022

(65) Prior Publication Data

US 2023/0128557 A1 Apr. 27, 2023

(30) Foreign Application Priority Data

Oct. 26, 2021 (JP) .................................. 2021-174395

(51) Int. Cl.
*H04L 9/40* (2022.01)
*G06F 8/65* (2018.01)
*H04L 45/02* (2022.01)

(52) U.S. Cl.
CPC ............ *H04L 63/0209* (2013.01); *G06F 8/65* (2013.01); *H04L 45/02* (2013.01)

(58) Field of Classification Search
CPC ........ H04L 45/02; H04L 63/0209; G06F 8/65
See application file for complete search history.

(56) References Cited

U.S. PATENT DOCUMENTS

| | | | | |
|---|---|---|---|---|
| 6,161,071 | A * | 12/2000 | Shuman .................. | G07C 5/085 340/901 |
| 6,353,785 | B1 * | 3/2002 | Shuman .................. | B60R 25/00 340/901 |
| 6,577,937 | B1 * | 6/2003 | Shuman ........... | G08G 1/096827 701/48 |
| 6,675,081 | B2 * | 1/2004 | Shuman ................ | B60R 25/302 701/48 |
| 9,374,355 | B2 * | 6/2016 | Schwarz ................. | H04L 63/12 |
| 10,427,655 | B2 * | 10/2019 | Nix ..................... | G06F 11/3072 |
| 10,668,929 | B2 * | 6/2020 | Tochioka ............ | B60W 30/025 |
| 10,764,134 | B2 * | 9/2020 | Barrett ................ | H04L 63/0263 |
| 10,991,175 | B2 * | 4/2021 | Zhang .................... | H04L 63/062 |
| 11,290,437 | B2 * | 3/2022 | Zhang .................... | H04L 63/065 |
| 11,360,762 | B2 * | 6/2022 | Teraoka ................. | G06F 8/658 |
| 11,538,287 | B2 * | 12/2022 | Fang ...................... | G07C 5/008 |
| 11,539,727 | B2 * | 12/2022 | Haga ..................... | H04W 4/48 |
| 11,546,363 | B2 * | 1/2023 | Haga ................... | H04L 63/1425 |

(Continued)

FOREIGN PATENT DOCUMENTS

| | | |
|---|---|---|
| JP | 2020088568 A | 6/2020 |
| JP | 2021105924 A | 7/2021 |

OTHER PUBLICATIONS

Japanese office action; Application 2021-174395; Oct. 15, 2024.

*Primary Examiner* — Sharon S Lynch
(74) *Attorney, Agent, or Firm* — Duft & Bornsen, PC

(57) ABSTRACT

An in-vehicle control system mounted on a vehicle includes: a first control unit; a second control unit connected to the first control unit via a first communication path; and a third control unit connected to the second control unit via a second communication path. The second control unit has an internal communication path configured to be able to connect the first communication path and the second communication path and connects the first communication path and the second communication path via the internal communication path when the vehicle is in a predetermined operation state.

8 Claims, 4 Drawing Sheets

(56) References Cited

U.S. PATENT DOCUMENTS

| | | | |
|---|---|---|---|
| 11,563,726 B2* | 1/2023 | Green | G06F 13/42 |
| 11,645,062 B2* | 5/2023 | Nakaguma | G06F 8/65 |
| | | | 717/168 |
| 11,671,463 B2* | 6/2023 | Leuwer | H04L 12/40032 |
| | | | 726/1 |
| 11,721,137 B2* | 8/2023 | Fang | G07C 5/0808 |
| | | | 701/31.5 |
| 11,736,357 B2* | 8/2023 | Fang | H04L 41/0893 |
| | | | 709/223 |
| 11,765,016 B2* | 9/2023 | Park | H04L 43/065 |
| | | | 370/216 |
| 11,972,248 B2* | 4/2024 | Ishikawa | G07C 5/008 |
| 12,046,085 B2* | 7/2024 | Fang | H04L 67/125 |
| 12,046,086 B2* | 7/2024 | Fang | G07C 5/008 |
| 12,073,664 B2* | 8/2024 | Fang | G07C 5/008 |
| 12,073,665 B2* | 8/2024 | Fang | G07C 5/0816 |
| 12,118,830 B2* | 10/2024 | Fang | G07C 5/008 |
| 12,142,091 B2* | 11/2024 | Fang | G07C 5/008 |
| 12,164,902 B2* | 12/2024 | Sakurai | G06F 8/65 |
| 2003/0065432 A1* | 4/2003 | Shuman | B60R 25/00 |
| | | | 701/1 |
| 2015/0121070 A1 | 4/2015 | Lau et al. | |
| 2015/0121071 A1* | 4/2015 | Schwarz | H04L 63/12 |
| | | | 713/168 |
| 2017/0113664 A1* | 4/2017 | Nix | G07C 5/0891 |
| 2017/0353350 A1* | 12/2017 | Gussen | H04B 10/116 |
| 2018/0107473 A1* | 4/2018 | Ahmed | G06F 8/654 |
| 2018/0281810 A1* | 10/2018 | Tochioka | B60W 40/09 |
| 2018/0281812 A1* | 10/2018 | Tochioka | B60W 50/0098 |
| 2019/0354363 A1* | 11/2019 | Nakaguma | G06F 13/128 |
| 2019/0394089 A1* | 12/2019 | Barrett | H04W 12/088 |
| 2020/0137099 A1* | 4/2020 | Haga | B60R 16/023 |
| 2020/0174778 A1* | 6/2020 | David | H04W 4/80 |
| 2020/0211301 A1* | 7/2020 | Zhang | H04L 63/065 |
| 2020/0213287 A1* | 7/2020 | Zhang | H04L 63/123 |
| 2020/0249937 A1* | 8/2020 | Teraoka | G06F 8/658 |
| 2020/0304532 A1* | 9/2020 | Haga | H04L 12/4625 |
| 2021/0176092 A1* | 6/2021 | Frischmuth | H04L 12/40032 |
| 2021/0192867 A1* | 6/2021 | Fang | G07C 5/0808 |
| 2021/0291821 A1* | 9/2021 | Dakemoto | B60W 30/09 |
| 2022/0004375 A1* | 1/2022 | Satoh | G06F 8/61 |
| 2022/0063585 A1* | 3/2022 | Tabata | B60L 58/20 |
| 2022/0253304 A1* | 8/2022 | Tamachi | B60W 50/04 |
| 2023/0004376 A1* | 1/2023 | Ishikawa | G06F 8/61 |
| 2023/0005305 A1* | 1/2023 | Sakurai | G06F 13/00 |
| 2023/0033167 A1* | 2/2023 | Sakurai | G06F 8/65 |
| 2024/0086174 A1* | 3/2024 | Nakamura | B60R 16/02 |
| 2024/0134628 A1* | 4/2024 | Teraoka | G06F 13/00 |
| 2024/0231798 A9* | 7/2024 | Teraoka | G06F 8/65 |
| 2024/0267221 A1* | 8/2024 | Yoshimi | H04L 9/0822 |

* cited by examiner

IN-VEHICLE CONTROL APPARATUS

CROSS-REFERENCE TO RELATED APPLICATION

This application is based upon and claims the benefit of priority from Japanese Patent Application No. 2021-174395 filed on Oct. 26, 2021, the content of which are incorporated herein by reference.

BACKGROUND OF THE INVENTION

Field of the Invention

This invention relates to an in-vehicle control system including electronic control units connected to each other via an in-vehicle communication network.

Description of the Related Art

Conventionally, as this type of apparatus, an apparatus is known in which update data for updating software of an electronic control apparatus included in a vehicle is downloaded from an external server and installed in the electronic control apparatus (see JP 2021-105924 A). In the apparatus described in JP 2021-105924 A, an update management unit connected to the Internet supplies update data downloaded from an external server via the Internet to the electronic control apparatus.

In recent years, the data size of update data has increased in vehicles and the like equipped with an advanced driver-assistance function. In addition, in a vehicle equipped with an advanced driver-assistance function, security in communication with the outside is regarded as important. Therefore, it is desirable to form an in-vehicle communication network that can easily achieve both efficient data transmission and security. However, in the apparatus described in JP 2021-105924 A, there is a possibility that unauthorized access is performed to the electronic control apparatus via the update management unit connected to the Internet.

SUMMARY OF THE INVENTION

An aspect of the present invention is an in-vehicle control system mounted on a vehicle, includes: a first control unit; a second control unit connected to the first control unit via a first communication path; and a third control unit connected to the second control unit via a second communication path. The second control unit has an internal communication path configured to be able to connect the first communication path and the second communication path and connects the first communication path and the second communication path via the internal communication path when the vehicle is in a predetermined operation state.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1A to 6. An in-vehicle control system according to an embodiment of the present invention can be applied to a vehicle having an advanced driver-assistance system (ADAS).

Figure 1A:
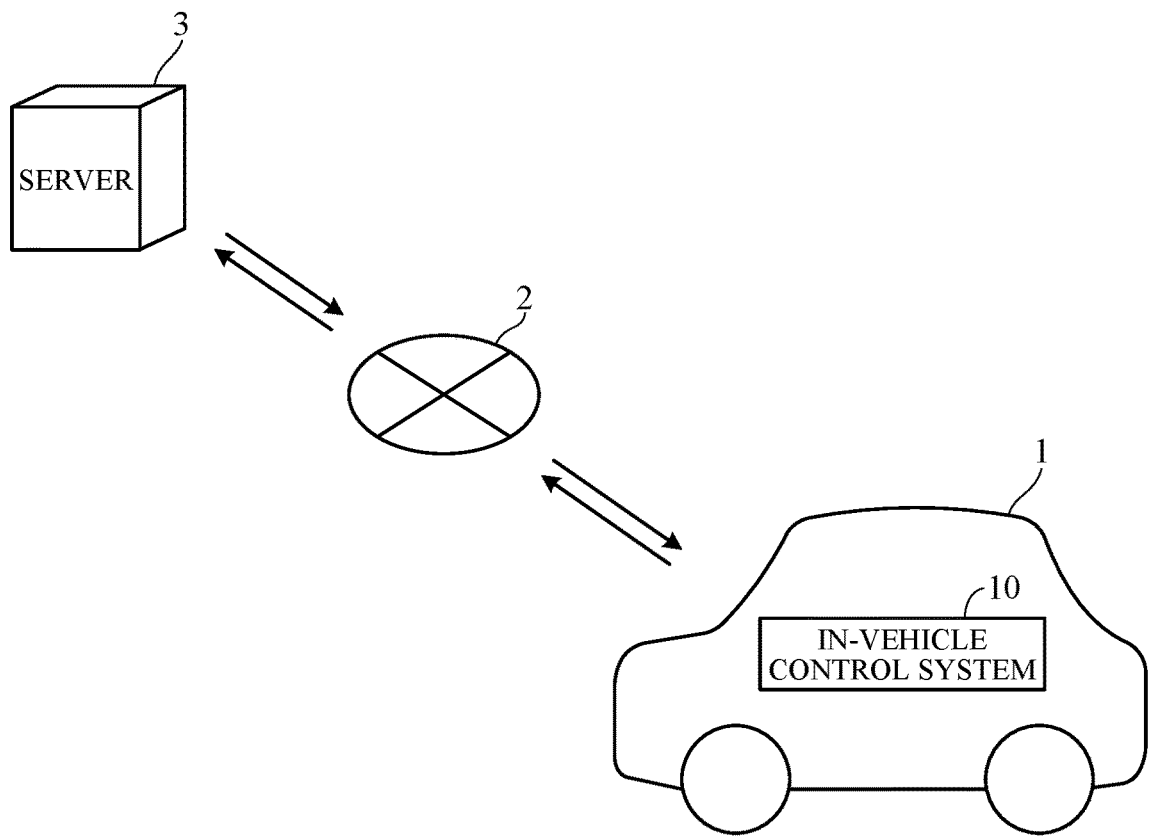
FIG. 1A is a diagram illustrating a reference example of an in-vehicle control system.
Figure 1B:
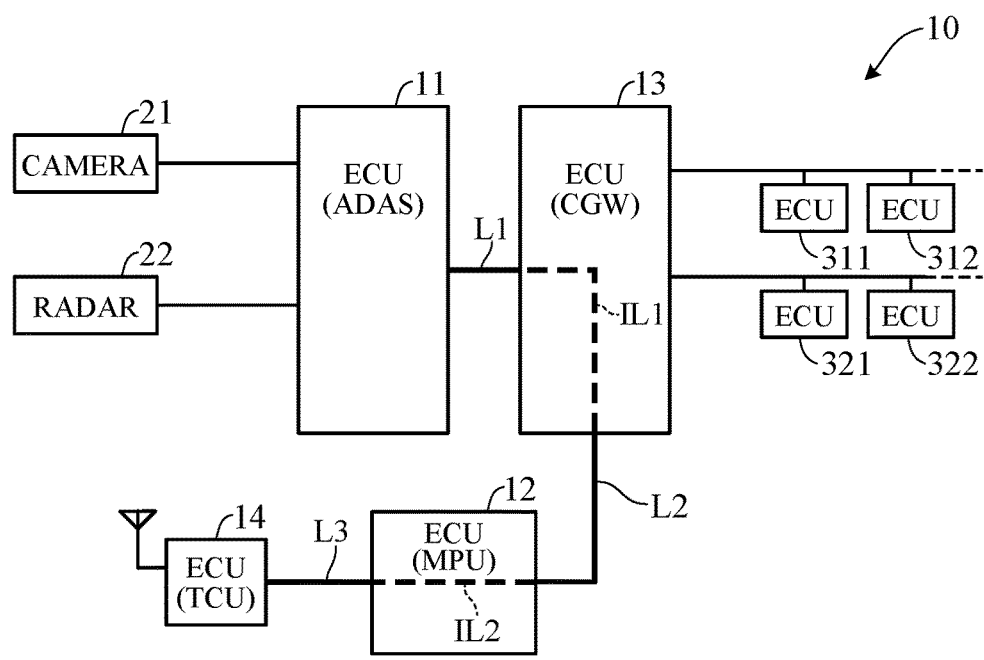
FIG. 1B is a diagram illustrating an example of a configuration of the in-vehicle control system in FIG. 1A.

First, the in-vehicle control system will be described. FIG. 1A is a diagram illustrating the example of the in-vehicle control system. As illustrated in FIG. 1A, an in-vehicle control system 10 is mounted on a vehicle 1. The in-vehicle control system 10 is communicably connected to an external device such as a server 3 via a network 2. The network 2 includes not only public wireless communication networks, but also a closed communication network provided for each predetermined management area, for example, a wireless LAN, Wi-Fi (registered trademark), Bluetooth (registered trademark), and the like. FIG. 1B is a diagram illustrating a reference example of a configuration of the in-vehicle control system 10 in FIG. 1A. As illustrated in FIG. 1B, the in-vehicle control system 10 includes electronic control units (ECUs) 11 to 14. Further, the in-vehicle control system 10 includes a plurality of in-vehicle communication networks connected via a controller area network (CAN), specifically, an in-vehicle communication network including ECUs 311 and 312 and an in-vehicle communication network including ECUs 321 and 322.

The ECU 14 is a communication unit (telematics control unit (TCU)) that performs wireless communication with an external device such as the server 3 via the network 2. The ECU 13 is a central gateway (CGW) and has a gateway function. The ECU (CGW) 13 relays communication between an external device and an in-vehicle communication network, or communication between a plurality of in-vehicle communication networks, which is performed via the ECU (TCU) 14. The CGW 13 further has a function of integrating various controls for causing the vehicle 1 to travel, such as powertrain control and chassis control.

The ECU 12 is a map positioning unit (MPU) that generates information (hereinafter, referred to as map data) on a highly accurate map (a map having a larger information amount than a map used by a navigation unit). The ECU (MPU) 12 includes a memory unit (not illustrated), and stores the generated map data in the memory unit. When map data having a region overlapping with the generated map data is stored in the memory unit, the MPU 12 updates the map data stored in the memory unit with the generated map data. In response to a request from the ECU 11, the MPU 12 reads the map data from the memory unit and supplies the map data to the ECU 11.

The ECU 11 is an ADAS ECU (hereinafter, simply referred to as ADAS) that implements an advanced driver-assistance function (ADAS) of the vehicle 1. A camera 21 is connected to the ECU (ADAS) 11 via a signal line of low voltage differential signaling (LVDS). Furthermore, a radar 22 is connected to the ADAS 11 via CAN with Flexible Data Rate (CAN-FD). The ADAS 11 controls an actuator for traveling and the like based on information (map data) supplied from the MPU 12 and information detected by the camera 21 and the radar 22. For example, a steering actuator that drives a steering device is controlled so that the vehicle 1 does not deviate from the lane on which the vehicle 1 is traveling. In this manner, the ADAS 11 implements the advanced driver-assistance function of the vehicle 1.

The ADAS 11 and the CGW 13, the CGW 13 and the MPU 12, and the MPU 12 and the TCU 14 are connected via a communication path L1, a communication path L2, and a communication path L3, respectively. The communication paths L1, L2, and L3 include a communication line having a higher speed than the CAN and the CAN-FD, for example, an Ethernet line.

The CGW 13 includes an internal communication path IL1 that can connect the communication path L1 and the communication path L2. The CGW 13 includes an Ethernet switch (not illustrated), and controls the Ethernet switch to bring the internal communication path IL1 into a connected state or a disconnected state. The MPU 12 includes an internal communication path IL2 that can connect the communication path L2 and the communication path L3. The MPU 12 includes an Ethernet switch (not illustrated), and controls the Ethernet switch to bring the internal communication path IL2 into a connected state or a disconnected state.

The server 3 includes a memory unit (not illustrated), and stores data (hereinafter, referred to as update data) for updating software (program) executed by each ECU of the in-vehicle control system 10 in the memory unit. The server 3 stores at least update data of software executed by the ADAS 11. The in-vehicle control system 10 downloads update data of each ECU from the server 3 via the network 2, supplies the update data to each ECU, and updates software of each ECU.

In recent years, with the advancement of ADAS and connectivity functions, the amount of data transmitted and received between the in-vehicle control system 10 and an external device and the amount of data transmitted and received between the in-vehicle communication networks of the in-vehicle control system 10 have increased. In addition, the data size of software installed in each ECU responsible for these functions also increases. Furthermore, in the ADAS and the connectivity function, security in communication with an external device is regarded as important. In order to cope with such a situation, it is required to further improve data transmission performance and security of the in-vehicle control system 10. Therefore, the present embodiment configures an in-vehicle control system as follows.

Figure 2:
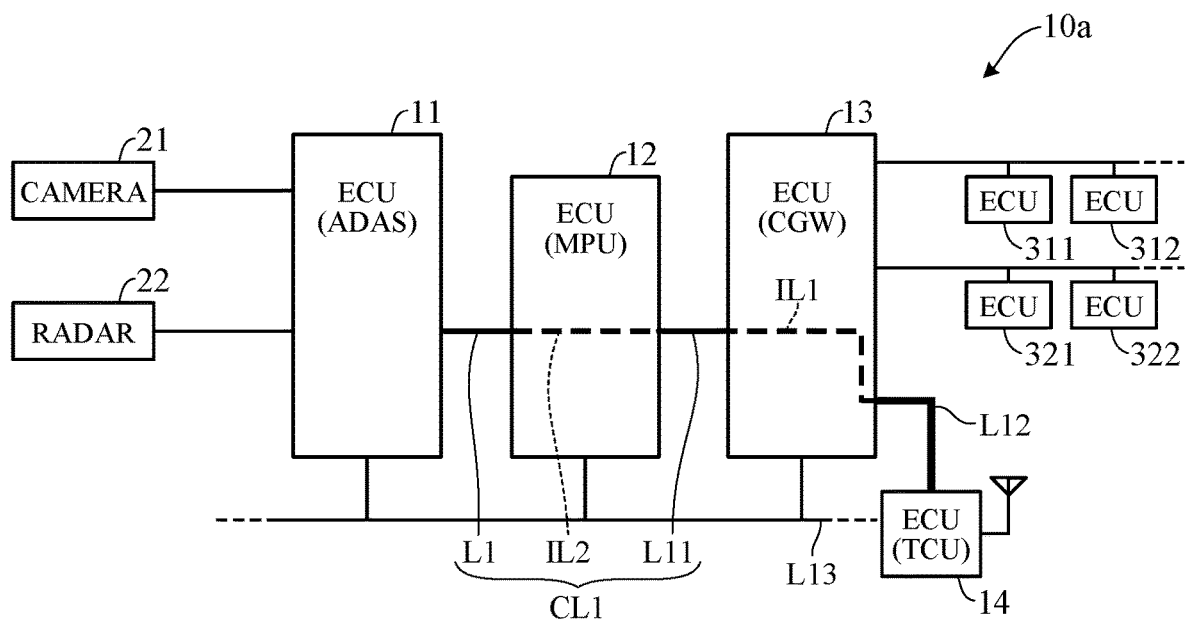
FIG. 2 is a diagram illustrating an example of a configuration of an in-vehicle control system according to an embodiment of the present invention.

FIG. 2 is a diagram illustrating an example of a configuration of an in-vehicle control system according to an embodiment of the present invention. In an in-vehicle control system 10a illustrated in FIG. 2, the MPU 12 disposed between the TCU 14 and the CGW 13 in the in-vehicle control system 10 in FIG. 1B is disposed on a downstream side of the CGW 13. Specifically, the MPU 12 is disposed between the CGW 13 and the ADAS 11. Hereinafter, a side close to the TCU 14 is referred to as an upstream side, and a side far from the TCU 14 is referred to as a downstream side. As described above, by disposing the MPU 12 on the downstream side of the CGW 13, it is possible to add a firewall on the downstream side of the CGW 13. More specifically, by installing a firewall in the MPU 12 disposed on the downstream side of the CGW 13, the firewall can be added on the downstream side of the CGW 13. This makes it easy to suppress unauthorized access to the ADAS 11 via the CGW 13.

In addition, by moving the MPU 12 to the downstream side of the CGW 13 as illustrated in FIG. 2 and directly connecting the CGW 13 and the TCU 14 through a communication path (Ethernet line) L12 faster than the communication paths L2 and L3 in FIG. 1B, the data transmission speed between the CGW 13 and the TCU 14 can be increased. Note that the communication path L12 only needs to be a communication line having a speed higher than at least the CAN or the CAN-FD, and may have a communication capacity equivalent to that of the communication paths L2 and L3.

The MPU 12 is connected to the ADAS 11 via the communication path L1, and is connected to the CGW 13 via a communication path L11. The MPU 12 can connect the communication path L1 and the communication path L11 via the internal communication path IL2. As a result, the CGW 13 and the ADAS 11 can be connected by a communication path CL1 constructed by the communication path L1, the MPU 12 (internal communication path IL2), and the communication path L11. Therefore, only by adding the communication path L11 to the configuration in FIG. 1B, the MPU 12 can be disposed between the CGW 13 and the ADAS 11 without reducing the data transmission speed between the CGW 13 and the ADAS 11. Note that the communication path L11 has a communication capacity equal to or larger than at least the communication capacity of the communication path L1.

Further, by disposing the MPU 12 having the internal communication path IL2 between the CGW 13 and the ADAS 11, the CGW 13 and the ADAS 11 can be connected or disconnected as necessary. For example, only when the software is installed in the ADAS 11, the internal communication path IL2 is brought into the connected state to connect the CGW 13 and the ADAS 11, and otherwise, the internal communication path IL2 is brought into the disconnected state to disconnect the CGW 13 and the ADAS 11. As a result, unauthorized access to the ADAS 11 via the CGW 13 is more easily suppressed.

Figure 3:
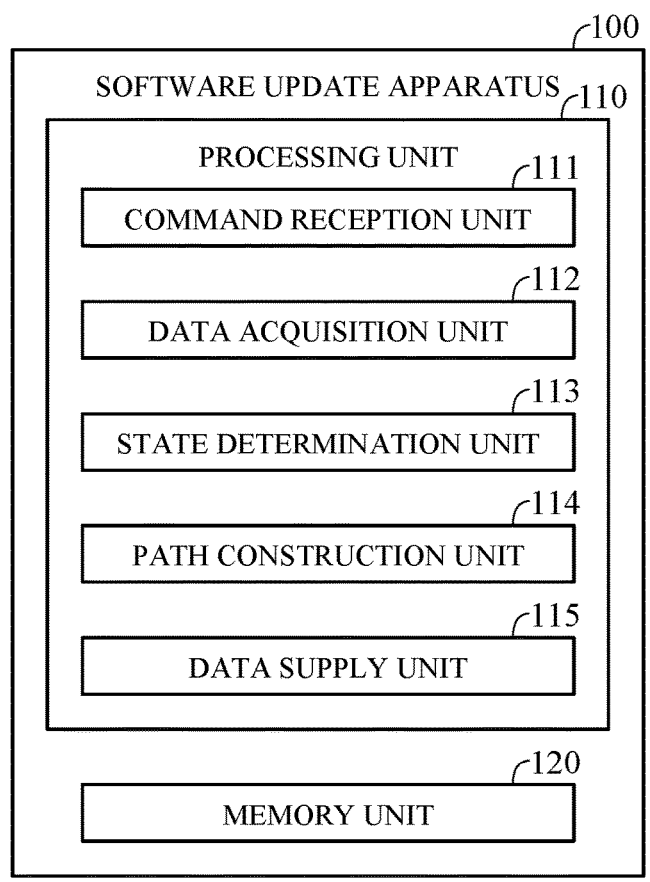
FIG. 3 is a block diagram illustrating a configuration of a main part of a software update apparatus according to the embodiment of the present invention.

FIG. 3 is a block diagram illustrating a configuration of a main part of a software update apparatus according to the embodiment of the present invention. A software update apparatus 100 in FIG. 3 constitutes a part of the in-vehicle control system 10a. As illustrated in FIG. 3, the software update apparatus 100 includes a computer including a processing unit 110 such as a CPU, a memory unit 120 such as a ROM, a RAM, and a hard disk, and other peripheral circuits. The processing unit 110 includes, as functional configurations, a command reception unit 111, a data acquisition unit 112, a state determination unit 113, a path construction unit 114, and a data supply unit 115. The command reception unit 111, the data acquisition unit 112, the state determination unit 113, and the path construction unit 114 are configured by a CPU (not illustrated) included in the MPU 12. The data supply unit 115 is configured by a CPU (not illustrated) included in the CGW 13. Note that the processing unit 110 may be configured by a single CPU (CPU included in a single ECU), or may be configured by combining CPUs included in a plurality of ECUs as described above. Furthermore, the memory unit 120 may be configured by a ROM or the like included in a single ECU, or may be configured by combining ROMs or the like included in a plurality of ECUs.

The command reception unit 111 receives an update command for updating software of each ECU of the in-vehicle control system 10*a*. The update command includes information of an ECU as a software update target (for example, identification information of the ECU as an update target) and information (for example, URL) that can specify a storage location of update data. The command reception unit 111 may receive an update command transmitted from an external device via the TCU 14, or may receive an update command output in response to a user operation from an operation unit (not illustrated) (a liquid crystal display or the like having a touch panel) provided in the vehicle 1.

The data acquisition unit 112 acquires update data for updating software of each ECU from an external device or the like based on the update command received by the command reception unit 111. For example, when the update command indicates that the ECU as an update target is the ADAS 11 and the storage location of the update data is the server 3, the data acquisition unit 112 downloads, from the server 3, the update data of the ADAS 11 stored in the memory unit (not illustrated) of the server 3 and acquires the update data.

The state determination unit 113 determines whether the vehicle 1 is in a predetermined operation state. The predetermined operation state is a state in which software update processing (program rewriting) of the ADAS 11 is possible, and is, for example, a state in which the vehicle 1 is stopped and an ignition switch is turned off.

When the state determination unit 113 determines that the vehicle 1 is in the predetermined operation state, the path construction unit 114 constructs a communication path for supplying update data to the ADAS 11. Specifically, the path construction unit 114 brings the internal communication path IL2 into a connected state to connect the communication path L1 and the communication path L11. On the other hand, when the state determination unit 113 determines that the vehicle 1 is no longer in the predetermined operation state, the path construction unit 114 brings the internal communication path IL2 into a disconnected state to disconnect the communication path L1 and the communication path L11. For example, when the ignition switch is turned on, the state determination unit 113 determines that the predetermined operation state is no longer established. The initial state of the internal communication path IL2 is a disconnected state.

The data supply unit 115 supplies the update data acquired by the data acquisition unit 112 to the ADAS 11 via the communication path CL1 constructed by the path construction unit 114, and installs the software. More specifically, the data supply unit 115 develops the update data in a ROM (not illustrated) of the ADAS 11 to update the software of the ADAS 11.

Figure 4:
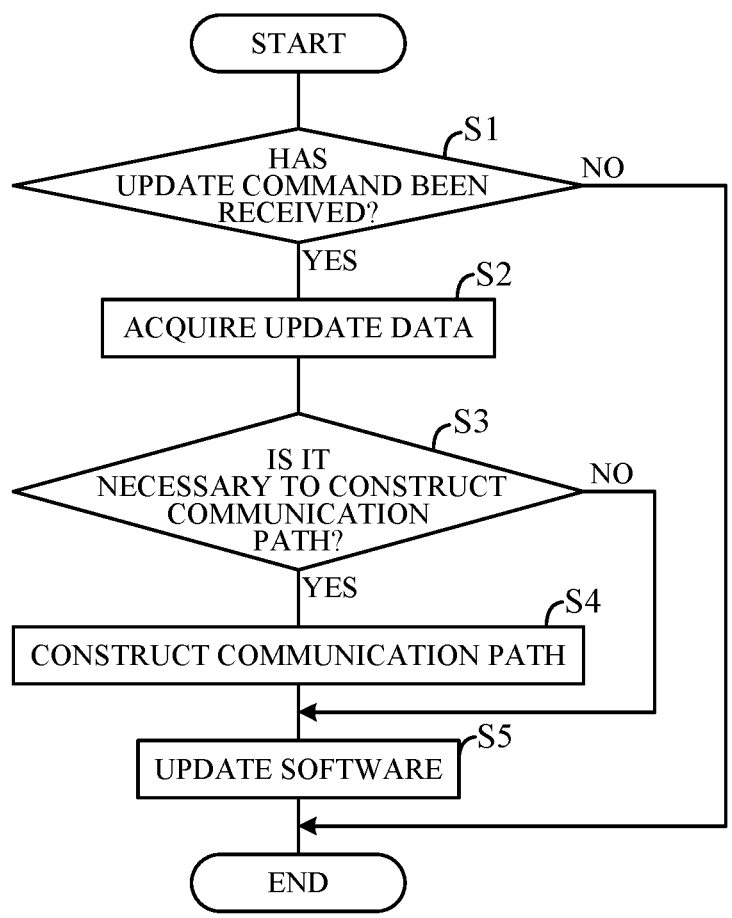
FIG. 4 is a flowchart illustrating an example of processing executed by the processing unit of a software update apparatus.

FIG. 4 is a flowchart illustrating an example of processing executed by the processing unit 110 of the software update apparatus 100 according to a program stored in advance. The processing illustrated in this flowchart is started, for example, when power is supplied to the in-vehicle control system 10*a*, and is repeated at a predetermined cycle. Hereinafter, a case where update data is stored in the memory unit of the server 3, and the software update apparatus 100 downloads the update data from the memory unit of the server 3 and updates the software of the ECU as an update target will be described as an example.

First, in step S1 (S: processing step), it is determined whether an update command has been received. When the determination is negative in S1, the processing is ended. When the determination is affirmative in S1, update data is acquired in S2. Specifically, the update data is downloaded from the memory unit of the server 3 based on the information included in the update command. The downloaded update data is stored in the memory unit 120.

In S3, it is determined whether it is necessary to construct a communication path necessary for installing software, that is, the communication path CL1. When the determination is negative in S3, the processing proceeds to S5. When the determination is affirmative in S3, the communication path CL1 is constructed in S4. For example, when the update command received in S1 includes information indicating that the ADAS 11 is a software update target, it is determined in S3 that the communication path CL1 needs to be constructed. Then, in S4, when the vehicle 1 is in a predetermined operation state, the internal communication path IL2 is brought into a connected state to connect the communication path L1 and the communication path L11. At this time, the internal communication path IL1 is also brought into a connected state to connect the communication path L11 and the communication path L12. These communication paths are established, for example, by activating the ECUs 11 to 14 by the software update apparatus 100 when the ignition switch is turned off. Note that the internal communication path IL1 may be set to the connected state at all times while power is supplied to the in-vehicle control system 10*a*.

In S5, the update data downloaded in S1 is read from the memory unit 120 and developed in the ROM of the ADAS 11 to update the software of the ADAS 11.

According to the embodiment of the present invention, the following operational effects can be achieved.

(1) The in-vehicle control system 10*a* is mounted on the vehicle 1, and includes the ADAS 11 as a first control unit, the MPU 12 as a second control unit connected to the ADAS 11 via a first communication path (communication path L1), and the CGW 13 as a third control unit connected to the MPU 12 via a second communication path (communication path L11). The MPU 12 generates map data and supplies the map data to the ADAS 11 via the communication path L1. The MPU 12 has a first internal communication path (internal communication path IL2) that can connect the communication path L1 and the communication path L11, and connects the communication path L1 and the communication path L11 via the internal communication path IL2 when the vehicle 1 is in a predetermined operation state.

With this configuration, a communication path for supplying data from the CGW 13 to the ADAS 11 is constructed by the internal communication path IL2 of the MPU 12 and the communication path L1 for supplying map data from the MPU 12 to the ADAS 11. Therefore, data can be supplied from the CGW 13 to the ADAS 11 only by adding the communication path L11 without separately providing a communication path that directly connects the CGW 13 and the ADAS 11. Therefore, an increase in cost of the in-vehicle control system 10*a* can be suppressed.

Figure 5:
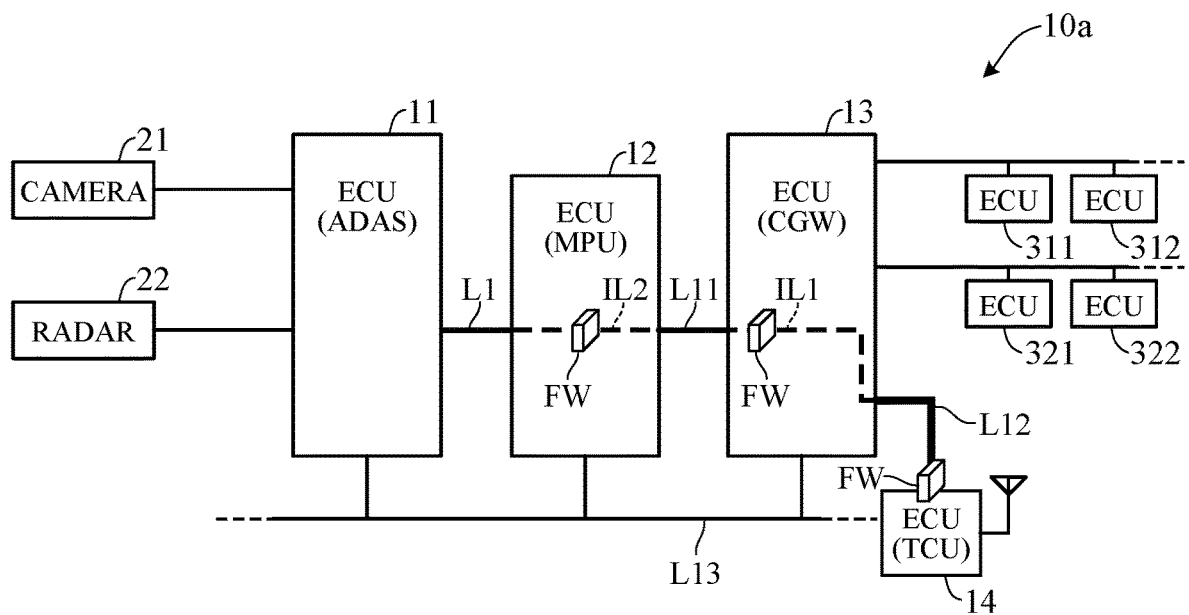
FIG. 5 is a diagram illustrating another example of the configuration of the in-vehicle control system according to the embodiment of the present invention.

Further, by disposing the MPU 12 between the CGW 13 and the ADAS 11, a firewall can be added to the downstream side of the CGW 13. FIG. 5 is a diagram illustrating another example of the configuration of the in-vehicle control system according to the embodiment of the present invention. FIG. 5 illustrates an example in which a firewall FW is installed in each of the MPU 12, the CGW 13, and the TCU 14 of the in-vehicle control system 10*a* in FIG. 2. As illustrated in FIG. 5, by installing the firewall FW in the MPU 12 disposed between the CGW 13 and the ADAS 11, the firewall can be added to the downstream side of the CGW 13. As a result, unauthorized access to the ADAS 11 from an external device or another in-vehicle communication network via the CGW 13 can be suppressed.

(2) When the program of the ADAS 11 is being rewritten, the MPU 12 connects the communication path L1 and the communication path L11 via the internal communication path IL2. With this configuration, the update data for rewriting the program of the ADAS 11 can be supplied from the CGW 13 to the ADAS 11 via the MPU 12. In addition, since the communication path L1 and the communication path L11 are connected only when the program of the ADAS 11 is rewritten, unauthorized access to the ADAS 11 from an external device or another in-vehicle communication network via the CGW 13 can be further suppressed.

(3) The ADAS 11, the MPU 12, and the CGW 13 are connected to each other via a third communication path (communication path L13) having a smaller communication capacity than any of the communication paths L1 and L11 and the internal communication path IL2. With this configuration, the communication path can be switched based on the capacity of the data transmitted among the ADAS 11, the MPU 12, and the CGW 13. For example, the communication path L13 is used when data having a relatively small capacity such as a command or control data is transmitted between the ADAS 11, the MPU 12, and the CGW 13, and the communication path constructed by the communication path L1, the MPU 12 (internal communication path IL2), and the communication path L11 is used when data having a relatively large capacity such as update data is transmitted. Accordingly, power consumption required for data transmission can be reduced.

(4) The in-vehicle control system 10*a* further includes the TCU 14 capable of communicating with a device outside the vehicle 1 (for example, the server 3). The CGW 13 acquires update data for rewriting the program of the ADAS 11 from an external device via the TCU 14. With this configuration, the CGW 13 can acquire the update data from the external device, and can flexibly update the software of the ADAS 11. Furthermore, the CGW 13 and the TCU 14 are connected via a fourth communication path (communication path L12) having a larger communication capacity than the communication path L13. With this configuration, the time (download time) required for the CGW 13 to download the update data from the external device can be shortened. Therefore, energy efficiency required for software update can be improved.

Figure 6:
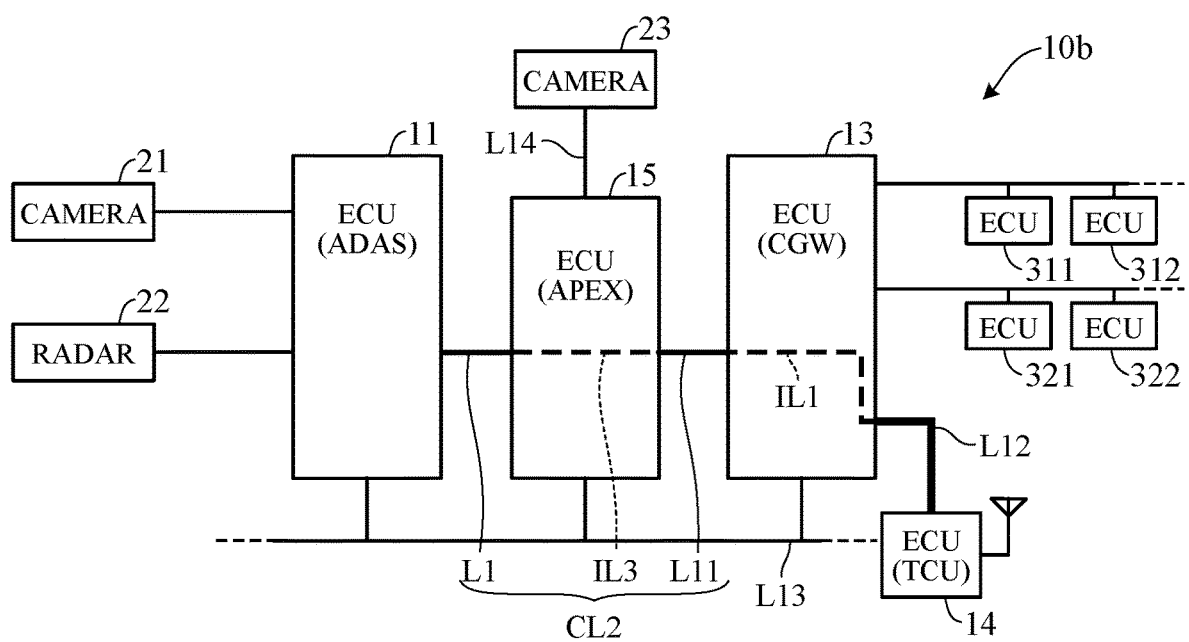
FIG. 6 is a block diagram illustrating an example of a configuration of an in-vehicle control system according to a modification of the embodiment of the present invention.

The above embodiment can be changed to various forms. Hereinafter, a modification will be described. In the above embodiment, the in-vehicle control system 10*a* including the MPU 12 that supplies the map data to the ADAS 11 has been described as an example. However, the present invention is also applicable to an in-vehicle control system including an ECU (hereinafter, referred to as a recognition extension unit (ADAS Perception Extension: APEX)) that supplies information of a traveling path (hereinafter, track information) of the vehicle 1 to the ADAS 11. FIG. 6 is a block diagram illustrating an example of a configuration of an in-vehicle control system according to the present modification.

As illustrated in FIG. 6, an in-vehicle control system 10*b* includes the ADAS 11, the ECU (APEX) 15, and the CGW 13. A camera 23 is connected to the APEX 15 via a communication path L14. The camera 23 captures an image of a space (for example, a front space) around the vehicle 1, and outputs captured image data to the APEX 15 via the communication path L14. The communication path L14 is, for example, a signal line of the LVDS, and has a larger communication capacity than the communication path L13.

The APEX 15 recognizes a traveling path of the vehicle 1 based on the captured image data input from the camera 23, and outputs traveling path information including the recognition result to the ADAS 11 via the communication path L1. In addition, the APEX 15 has an internal communication path IL3 capable of connecting the communication path L1 and the communication path L11. Further, the APEX 15 includes an Ethernet switch (not illustrated), and controls the Ethernet switch to bring the internal communication path IL3 into a connected state or a disconnected state. The ADAS 11 controls an actuator for traveling or the like so that the vehicle 1 does not deviate from the lane on which the vehicle 1 is traveling based on the information (traveling path information) supplied from the APEX 15. As described above, in the present modification, the ADAS 11 implements the advanced driver-assistance function of the vehicle 1 based on the traveling path information supplied from the APEX 15.

The configuration and operation of the software update apparatus constituting a part of the in-vehicle control system 10*b* are similar to the configuration and operation of the software update apparatus 100 in FIG. 3. In the software update apparatus according to the present modification, when the state determination unit 113 determines that the vehicle 1 is in the predetermined operating state, the path construction unit 114 brings the internal communication path IL3 into a connected state to connect the communication path L1 and the communication path L11. When the state determination unit 113 determines that the vehicle 1 is no longer in the predetermined operation state, the path construction unit 114 brings the internal communication path IL3 into a disconnected state to disconnect the communication path L1 and the communication path L11.

With this configuration, since data can be supplied from the ADAS 11 to the CGW 13 via the communication path CL2 constructed by the communication path L1, the APEX 15 (internal communication path IL3), and the communication path L11, it is not necessary to separately provide a communication path that directly connects the ADAS 11 and the CGW 13. Therefore, an increase in cost of the in-vehicle control system 10*b* can be suppressed. Further, by installing the firewall in the APEX 15 disposed between the ADAS 11 and the CGW 13, security of data supplied from an external device or an in-vehicle communication network to the ADAS 11 can be improved.

In the above embodiment, the Ethernet switch included in the MPU 12 brings the internal communication path IL1 into the connected state or the disconnected state, but other network devices than the Ethernet switch may bring a first internal communication path into the connected state or the disconnected state. Similarly, the Ethernet switches included in the ECUs 13 and 15 (CGW 13 and APEX 15) respectively bring the internal communication path IL2 and IL3 into the connected state or the disconnected state, but other network devices than the Ethernet switch may bring a second internal communication path into the connected state or the disconnected state.

In the above embodiment, the configuration of the in-vehicle control system 10*b* has been described using the case where the camera 23 as an image capturing unit is connected to the APEX 15 via the communication path L14 (fifth communication path) which is the LVDS as an example. However, the fifth communication path may by any communication line (signal line) with greater communication capacity than the communication path L13, and the image capturing unit and the APEX 15 may be connected via other communication lines (signal lines).

The above embodiment can be combined as desired with one or more of the above modifications. The modifications can also be combined with one another.

According to the present invention, it is possible to form an in-vehicle communication network that can achieve both efficient data transmission and security.

Above, while the present invention has been described with reference to the preferred embodiments thereof, it will be understood, by those skilled in the art, that various changes and modifications may be made thereto without departing from the scope of the appended claims.

What is claimed is:

1. An in-vehicle control system mounted on a vehicle, the in-vehicle control system comprising:
   a first electronic control unit configured to implement an advanced driver-assistance function of the vehicle;
   a second electronic control unit connected to the first electronic control unit via a first communication path;
   a third electronic control unit connected to the second control unit via a second communication path, and
   a communication unit capable of communicating with an external device outside the vehicle, wherein
   the second electronic control unit has a first internal communication path configured to be able to connect the first communication path and the second communication path and a network switch switching the first internal communication path between a connected state and a disconnected state, controls the network switch to set the first internal communication path to the connected state when receiving an update command for updating software of the first electronic control unit while an ignition switch is turned off, and controls the network switch to set the first internal communication path to the disconnected state when receiving the update command while the ignition switch is turned on,
   the third electronic control unit includes a second internal communication path configured to be able to connect the second communication path and a fourth communication path connecting the third electronic control unit and the communication unit, and
   the second electronic control unit, the third electronic control unit and the communication unit include a firewall, respectively, and wherein
   the firewall of the second electronic control unit is installed on the first internal communication path,
   the firewall of the third electronic control unit is installed on the second internal communication path, and
   the third electronic control unit supplies, via the second internal communication path, the second communication path, the first internal communication path and the first communication path, the first electronic control unit with update data for updating a program of the first electronic control unit acquired via the firewall of the communication unit and the fourth communication path from the external device.

2. The in-vehicle control system according to claim 1, wherein
   the first electronic control unit, the second electronic control unit and the third electronic control unit are connected to each other via a third communication path whose communication capacity is smaller than the communication capacity of each of the first communication path, the second communication path and the first internal communication path.

3. The in-vehicle control system according to claim 2, wherein
   the third electronic control unit and the communication unit are connected via the fourth communication path whose communication capacity is larger than the third communication path.

4. The in-vehicle control system according to claim 3, wherein
   the third electronic control unit acquires the update data from the external device via the communication unit.

5. The in-vehicle control system according to claim 1, wherein
   the second electronic control unit is an electronic control unit generating map data.

6. The in-vehicle control system according to claim 5, wherein
   the second electronic control unit supplies the map data to the first electronic control unit via the first communication path.

7. The in-vehicle control system according to claim 2, wherein
   the second electronic control unit is an electronic control unit recognizing a traveling path of the vehicle, is connected to an image capturing unit outputting captured image data of a surrounding area of the vehicle via a fifth communication path whose communication capacity is larger than the third communication path, and acquires the captured image data from the image capturing unit via the fifth communication path to supply the captured image data to the first control unit via the first communication path.

8. The in-vehicle control system according to claim 1, wherein
   the second electronic control unit controls the network switch to set the first internal communication path to the disconnected state when the update command is not received.

* * * * *